United States Patent
Nelson et al.

(10) Patent No.: US 8,844,279 B2
(45) Date of Patent: Sep. 30, 2014

(54) HYDRAULIC FAN CIRCUIT

(75) Inventors: Bryan E. Nelson, Lacon, IL (US); Jeremy T. Peterson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 691 days.

(21) Appl. No.: 13/149,430

(22) Filed: May 31, 2011

(65) Prior Publication Data

US 2012/0304636 A1 Dec. 6, 2012

(51) Int. Cl.
| | |
|---|---|
| F16D 31/02 | (2006.01) |
| F16H 61/4104 | (2010.01) |
| F15B 7/00 | (2006.01) |
| F16H 61/4026 | (2010.01) |
| F01P 7/04 | (2006.01) |
| F16H 61/438 | (2010.01) |
| B60K 25/02 | (2006.01) |

(52) U.S. Cl.
CPC ... *F16H 61/4026* (2013.01); *F15B 2211/20569* (2013.01); *F15B 2211/212* (2013.01); *F16H 61/4104* (2013.01); *F15B 7/005* (2013.01); *F15B 2211/20523* (2013.01); *F15B 2211/7058* (2013.01); *F15B 2211/613* (2013.01); *F01P 7/044* (2013.01); *F15B 2211/20546* (2013.01); *B60K 2025/026* (2013.01); *F15B 7/008* (2013.01); *F16H 61/438* (2013.01)
USPC .................................. 60/456; 60/468; 60/494

(58) Field of Classification Search
USPC .................... 60/416, 484, 456, 494
See application file for complete search history.

(56) References Cited

U.S. PATENT DOCUMENTS

| | | | |
|---|---|---|---|
| 3,570,519 A | 3/1971 | Bianchetta | |
| 4,399,886 A * | 8/1983 | Pollman | 180/197 |
| 4,414,809 A | 11/1983 | Burris | |
| 5,531,190 A | 7/1996 | Mork | |
| 5,687,568 A | 11/1997 | Buschur | |
| 5,960,628 A | 10/1999 | Machesney et al. | |
| 5,975,233 A | 11/1999 | Eisenbacher | |
| 6,076,488 A | 6/2000 | Yamagishi | |

(Continued)

FOREIGN PATENT DOCUMENTS

| | | |
|---|---|---|
| DE | 195 31 413 | 2/1997 |
| EP | 1963687 | 9/2008 |

(Continued)

OTHER PUBLICATIONS http://www.eaton.com/EatonCom/ProductsServices/Hybrid/SystemsOverview/HybridElectric/index.htm printed on Nov. 30, 2010.

(Continued)

*Primary Examiner* — Edward Look
*Assistant Examiner* — Daniel Collins
(74) *Attorney, Agent, or Firm* — Finnegan, Henderson, Farabow, Garrett & Dunner LLP

(57) ABSTRACT

A hydraulic fan circuit includes a primary pump, a motor fluidly connected to the primary pump, and a fan operably connected to and driven by the motor. The circuit also includes a supply passage extending from the primary pump to the motor, a return passage extending from the motor to the primary pump, and a pressure limiting valve configured to selectively reduce pressure of a flow of pilot fluid directed to the primary pump. The circuit further includes an override valve configured to selectively connect the supply passage to the pressure limiting valve.

20 Claims, 2 Drawing Sheets

(56) References Cited

U.S. PATENT DOCUMENTS

| | | |
|---|---|---|
| 6,273,034 B1 | 8/2001 | Hawkins et al. |
| 6,648,115 B2 | 11/2003 | Smith et al. |
| 7,155,907 B2 | 1/2007 | Desjardins et al. |
| 7,240,486 B2 * | 7/2007 | Huang et al. .................. 60/413 |
| 7,273,122 B2 | 9/2007 | Rose |
| 7,360,357 B2 | 4/2008 | Zahniser |
| 7,444,809 B2 | 11/2008 | Smith et al. |
| 7,658,065 B2 | 2/2010 | Smith et al. |
| 2005/0196288 A1 | 9/2005 | Cherney |
| 2007/0006824 A1 | 1/2007 | Saotome |
| 2008/0108032 A1 | 5/2008 | Tuhy et al. |
| 2008/0134674 A1 * | 6/2008 | Geissler et al. .................. 60/464 |
| 2008/0207398 A1 | 8/2008 | Dvorak et al. |
| 2008/0238607 A1 | 10/2008 | Schuricht et al. |
| 2008/0250781 A1 | 10/2008 | Mueller et al. |
| 2009/0084102 A1 | 4/2009 | Mueller et al. |
| 2009/0100830 A1 | 4/2009 | Schneider et al. |
| 2009/0164084 A1 | 6/2009 | Hawkins et al. |
| 2010/0236232 A1 | 9/2010 | Boehm et al. |

FOREIGN PATENT DOCUMENTS

| | | |
|---|---|---|
| EP | 1967745 | 9/2008 |
| EP | 2270339 | 1/2011 |
| WO | WO 2006/038968 | 4/2006 |
| WO | WO 2006/055978 | 5/2006 |

OTHER PUBLICATIONS http://www.eaton.com/EatonCom/ProductsServices/Hybrid/SystemsOverview/HydraulicHLA/index.htm printed on Nov. 30, 2010.

http://www.eaton.com/EatonCom/ProductsServices/Hybrid/SystemsOverview/SeriesHydraulic/indm printed on Nov. 30, 2010.

* cited by examiner

HYDRAULIC FAN CIRCUIT

TECHNICAL FIELD

The present disclosure relates generally to a hydraulic fan circuit, and more particularly, to a hydraulic fan circuit configured to assist in machine braking.

BACKGROUND

Engine-driven machines such as, for example, dozers, loaders, excavators, motor graders, and other types of heavy equipment typically include a cooling system that cools the associated engine and other machine components below a threshold that provides for longevity of the machines. The cooling system typically consists of one or more air-to-air or liquid-to-air heat exchangers that reduce a temperature of the coolant circulated throughout the engine or combustion air directed into the engine. Heat from the coolant or combustion air is passed to air from a fan that is speed-controlled based on a temperature of the engine and/or associated hydraulic system.

The cooling system fan is generally hydraulically powered. That is, a pump driven by the engine draws in low-pressure fluid and discharges the fluid at elevated pressures to a motor that is connected to the fan. When a temperature of the engine is higher than desired, the pump and motor work together to increase the speed of the fan. When the temperature of the engine is low, the pump and motor work together to decrease the speed of the fan and, in some situations, even stop the fan altogether. Under some conditions, the fan rotation can even be reversed such that airflow through the heat exchanger is also reversed to help dislodge debris that has collected in the heat exchanger. In addition, since the fan and motor may function as a parasitic load on the engine, some systems may utilize the fan and motor to assist in reducing engine speed (i.e., braking).

Although effective at cooling the engine and reducing engine speed, it has been found that the hydraulic circuit driving the cooling fan described above may have excess capacity at times that is not utilized. With increasing focus on the environment, particularly on machine fuel consumption, it has become increasingly important to fully utilize all resources.

One attempt to improve hydraulic circuit efficiency is described in U.S. Pat. No. 7,658,065 that issued to Smith et al. on Feb. 9, 2010 ("the '065 patent"). Specifically, the '065 patent describes a hydraulic circuit having a hydraulic actuator, a primary pump configured to draw low-pressure fluid from a sump and discharge pressurized fluid to the actuator, and an in-sump energy recovery device configured to receive waste fluid returning from the actuator to the sump. The energy recovery device is driven by the returning waste fluid to feed low-pressure charge fluid to the primary pump, thereby reducing work performed by the primary pump. A flywheel is connected to the energy recovery device to kinetically store energy extracted from the returning waste fluid and selectively supply the stored energy back to the energy recovery device.

Although the energy recovery device of the '065 patent may improve efficiency of the associated hydraulic system, it may increase the cost of the system and have limited applicability. That is, the energy recovery device is an additional component that only performs energy recovery functions. Specialized devices like the energy recovery device add cost to the system. In addition, the energy recovery device is only shown and described with respect to an open circuit system. The disclosed recovery device is not particularly well suited to assist in reducing engine speed, nor is it easily calibrated without experienced technicians.

The disclosed hydraulic fan circuit is directed to overcoming one or more of the problems set forth above and/or other problems of the prior art.

SUMMARY

In one aspect, the present disclosure is directed to a hydraulic fan circuit. The hydraulic fan circuit may include a primary pump, a motor fluidly connected to the primary pump, and a fan operably connected to and driven by the motor. The circuit also includes a supply passage extending from the primary pump to the motor, a return passage extending from the motor to the primary pump, and a pressure limiting valve configured to selectively reduce pressure of a flow of pilot fluid directed to the primary pump. The circuit further includes an override valve configured to selectively connect the supply passage to the pressure limiting valve.

In another aspect, the present disclosure is directed to another hydraulic fan circuit. This hydraulic fan circuit may include a primary pump, a motor driven by the primary pump, and a fan connected to and driven by the motor. The circuit also includes a pressure control valve configured to receive a flow of pilot fluid and to control a speed of the fan, a supply passage, and a return passage. The supply and return passages fluidly connect the motor to the primary pump in a closed circuit configuration. The circuit further includes a pressure resolver fluidly connected to the supply and return passages, and a pressure limiting valve fluidly connected to the pressure resolver and configured to prevent the fan from exceeding a maximum cooling speed by limiting pressure of the flow of pilot fluid. The circuit also includes an override valve fluidly connected intermediate the pressure resolver and the pressure limiting valve, the override valve configured to assist in increasing the speed of the fan above the maximum cooling speed.

In yet another exemplary embodiment of the present disclosure, a method of reducing engine speed with a hydraulic fan circuit includes driving a primary pump with a combustion engine, and directing a pressurized flow of fluid from the primary pump to a fan motor. The method further includes generating a flow of air with a fan connected to the fan motor, the flow of air assisting in cooling the engine. The method also includes receiving a request for engine speed reduction, and responsively increasing a speed of the fan above a maximum cooling speed and below a fan speed corresponding a structural limit of the fan. In such a method, responsively increasing the speed of the fan includes overriding a fluid pressure limitation associated with at least one of the primary pump and the fan motor.

DETAILED DESCRIPTION

Figure 1:
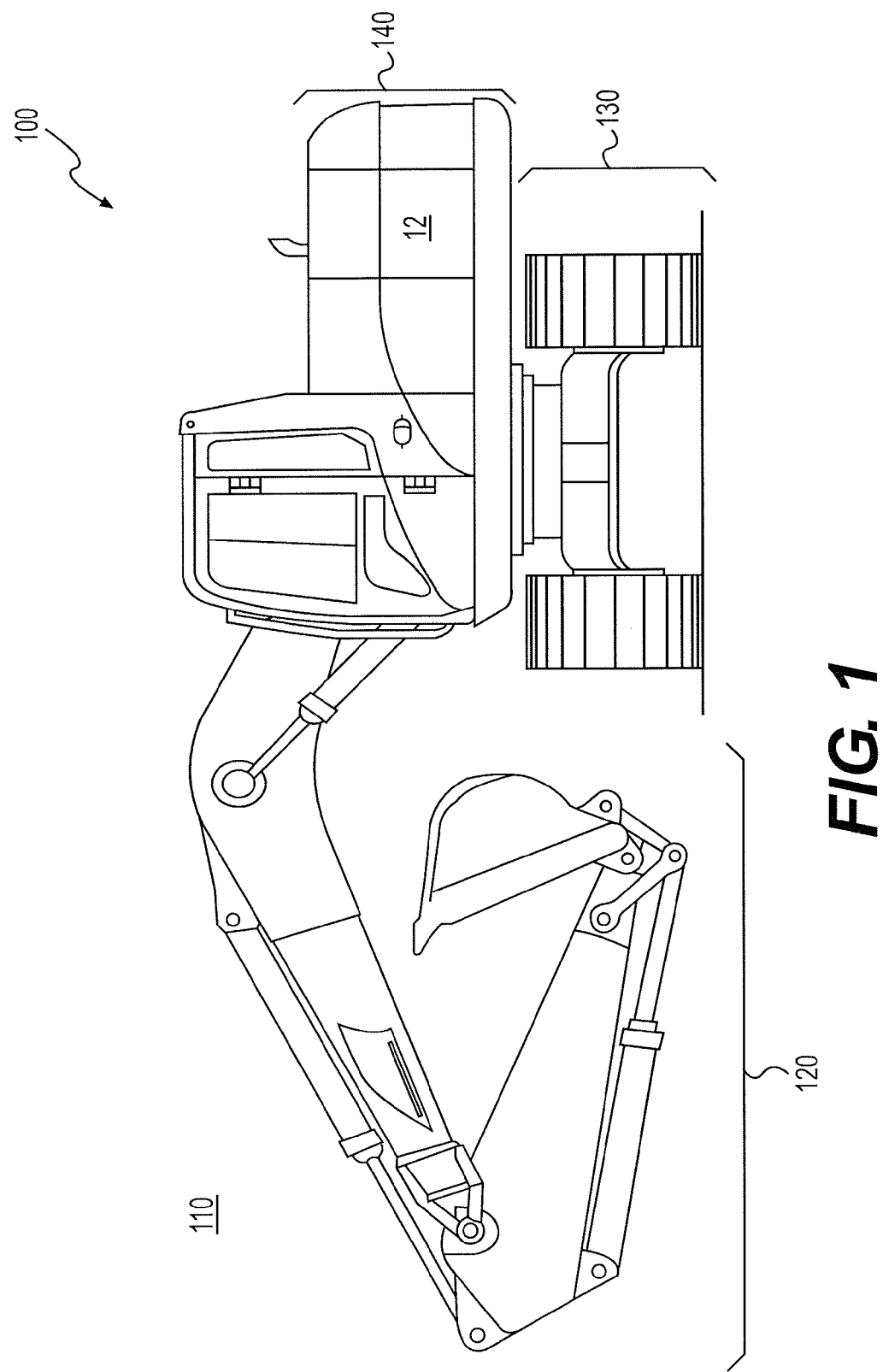
FIG. 1 is a pictorial illustration of an exemplary machine.

FIG. 1 illustrates an exemplary machine 100 performing a particular function at a worksite 110. Machine 100 may embody a stationary or mobile machine, with the particular function being associated with an industry such as mining, trash and/or waste management, construction, farming, transportation, power generation, oil and gas, or any other industry known in the art. For example, machine 100 may be an earth moving machine such as the excavator depicted in FIG. 1, in which the particular function includes the removal of earthen material from worksite 110 that alters the geography of worksite 110 to a desired form. Machine 100 may alternatively embody a different earth moving machine such as a motor grader or a wheel loader, or a non-earth moving machine such as a passenger vehicle, a stationary generator set, or a pumping mechanism. Machine 100 may embody any suitable operation-performing machine.

Machine 100 may be equipped with multiple systems that facilitate the operation of machine 100 at worksite 110, for example a tool system 120, a drive system 130, and an engine system 140 that provides power to tool system 120 and drive system 130. During the performance of most tasks, power from engine system 140 may be disproportionately split between tool system 120 and drive system 130. That is, machine 100 may generally be either traveling between excavation sites and primarily supplying power to drive system 130, or parked at an excavation site and actively moving material by primarily supplying power to tool system 120. Machine 100 generally will not be traveling at high speeds and actively moving large loads of material with tool system 120 at the same time. Accordingly, engine system 140 may be sized to provide enough power to satisfy a maximum demand of either tool system 120 or of drive system 130, but not both at the same time. Although sufficient for most situations, there may be times when the total power demand from machine systems (e.g., from tool system 120 and/or drive system 130) exceeds a power supply capacity of engine system 140. Engine system 140 may be configured to recover stored energy during these times to temporarily increase its supply capacity. This additional supply capacity may also or alternatively be used to reduce a fuel consumption of engine system 140 by allowing for selective reductions in the power production of engine system 140, if desired.

Figure 2:
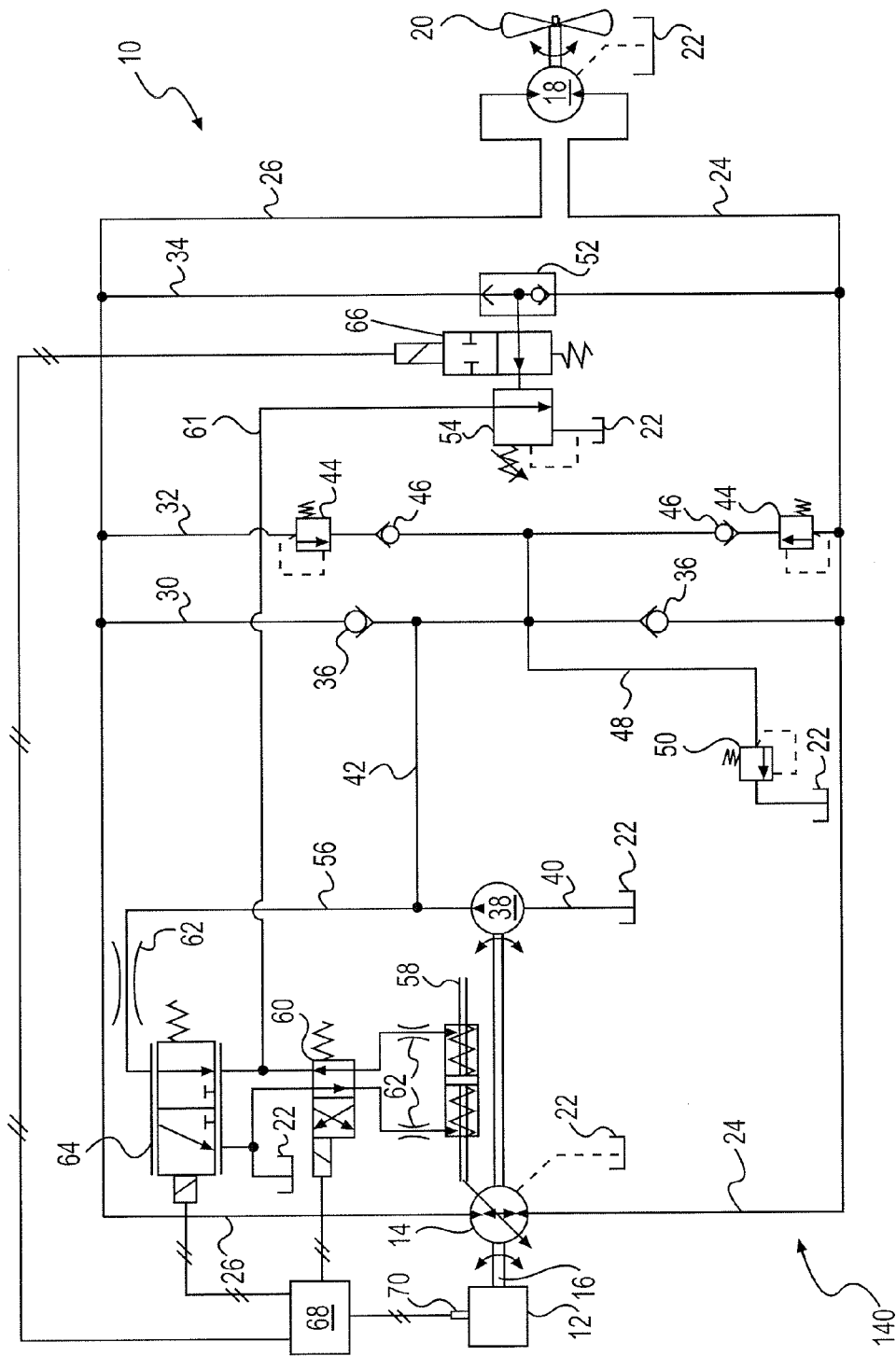
FIG. 2 is a schematic illustration of an exemplary hydraulic fan circuit that may be used with the machine of FIG. 1.

As illustrated in FIG. 2, engine system 140 may include an engine 12 equipped with a hydraulic fan circuit 10. The engine 12 may embody an internal combustion engine, for example a diesel, gasoline, or gaseous fuel-powered engine. Hydraulic fan circuit 10 may include a collection of components that are powered by engine 12 to cool engine 12. Specifically, hydraulic fan circuit 10 may include a primary pump 14 connected directly to a mechanical output 16 of engine 12, a motor 18 fluidly connected to primary pump 14 in a closed-circuit configuration, and a fan 20 connected to motor 18. Engine 12 may drive primary pump 14 via mechanical output 16 to draw in low-pressure fluid and discharge the fluid at an elevated pressure. Motor 18 may receive and convert the pressurized fluid to mechanical power that drives fan 20 to generate a flow of air. The flow of air may be used to cool engine 12 directly and/or indirectly by way of a heat exchanger (not shown).

Primary pump 14 may be an over-center, variable-displacement or variable-delivery pump driven by engine 12 to pressurize fluid. For example, primary pump 14 may embody a rotary or piston-driven pump having a crankshaft (not shown) connected to engine 12 via mechanical output 16 such that an output rotation of engine 12 results in a corresponding pumping motion of primary pump 14. The pumping motion of primary pump 14 may function to draw in low-pressure fluid from motor 18 via a return passage 24, and discharge the fluid at an elevated pressure to motor 18 via a supply passage 26. Primary pump 14 may be dedicated to supplying pressurized fluid to only motor 18 via supply passage 26 or, alternatively, may also supply pressurized fluid to other hydraulic circuits (not shown) associated with engine 12 or machine 100, if desired. Similarly, primary pump 14 may be dedicated to drawing low-pressure fluid from only motor 18 via return passage 24 or, alternatively, may also draw in low-pressure fluid from other hydraulic circuits (not shown) associated with engine 12 or machine 100, if desired. It should be noted that, in some situations, primary pump 14 and motor 18 may be operated in a reverse flow direction and, in these situations, the fluid pressures within return and supply passages 24, 26 may be reversed.

Motor 18 may include a fixed displacement rotary- or piston-type hydraulic motor movable by an imbalance of pressure acting on a driven element (not shown), for example an impeller or a piston. Fluid pressurized by primary pump 14 may be directed into motor 18 via supply passage 26 and drained from motor 18 via return passage 24. The direction of pressurized fluid to one side of the driven element and the draining of fluid from an opposing side of the driven element may create a pressure differential across the driven element that causes the driven element to move or rotate. The direction and rate of fluid flow through motor 18 may determine the rotational direction and speed of motor 18 and fan 20, while the pressure imbalance of the fluid may determine the torque output.

Fan 20 may be disposed proximate an air-to-air or liquid-to-air heat exchanger (not shown) and configured to produce a flow of air directed through channels of the exchanger for heat transfer with coolant or combustion air therein. Fan 20 may include a plurality of blades connected to motor 18 and be driven by motor 18 at a speed corresponding to a desired flow rate of air and/or a desired engine coolant temperature. In one embodiment, a flywheel (not shown) may be connected to one of fan 20 and motor 18 to rotate therewith. In another embodiment, the flywheel may be incorporated into fan 20 (i.e., fan 20 may be oversized), if desired.

Return and supply passages 24, 26 may be interconnected via multiple different crossover passages. In the exemplary embodiment, three different crossover passages interconnect return and supply passages 24 and 26, including a makeup passage 30, a relief passage 32, and a pressure limiting passage 34. Makeup passage 30 may provide makeup fluid to return and/or supply passages 24, 26 to help ensure that hydraulic fan circuit 10 remains full of fluid. Relief passage 32 may provide a leak path for high-pressure fluid within return and/or supply passages 24, 26 such that damage to the components of hydraulic fan circuit 10 caused by excessive pressures may be avoided. Pressure limiting passage 34 may provide for pilot pressure control of a displacement of primary pump 14.

One or more makeup valves 36, for example check valves, may be located within makeup passage 30 to selectively connect the output from a charge pump 38 with return and/or supply passages 24, 26 based on pressures of fluid in the different passages. That is, when a pressure within return and/or supply passage 24, 26 falls below a pressure of fluid discharged by charge pump 38, makeup valve(s) 36 may open and allow fluid to pass from charge pump 38 into the respective passage(s). Charge pump 38 may be driven by engine 12 to rotate with primary pump 14 and draw in fluid from a low-pressure sump 22 via a tank passage 40 and discharge the fluid into makeup passage 30 via a valve passage 42. In additional exemplary embodiments, the charge pump 38 may be driven by one or more additional power sources such as, for example, an electric motor associated with the machine 100.

One or more relief valves 44 and check valves 46 may be located within relief passage 32. Relief valves 44 may be spring-biased and movable in response to a pressure of return and/or supply passages 24, 26 to selectively connect the respective passages with a low-pressure passage 48, thereby relieving excessive fluid pressures within return and supply passages 24, 26. An additional spring-biased pressure relief valve 50 may be located within return passage 48 and selectively moved by a pressure within low-pressure passage 48 between flow-passing and flow-blocking (shown in FIG. 2) positions to limit a maximum pressure within low-pressure passage 48. Check valves 46 may help ensure unidirectional flows of fluid into low-pressure passage 48 from return and supply passages 24, 26.

A resolver 52 may be disposed within pressure limiting passage 34 and associated with a pilot pressure limiter 54. Resolver 52 may be any type of valve or known flow limiting device configured to connect fluid from the one of return and supply passages 24, 26 having the greater pressure with pilot pressure limiter 54. In most instances, resolver 52 connects the pressure from supply passage 26 with pilot pressure limiter 54 (shown in FIG. 2). However, when primary pump 14 and motor 18 are operating in the reverse flow direction or during an overrunning condition of motor 18, it may be possible for the pressure within return passage 24 to exceed the pressure within supply passage 26. Under these conditions, resolver 52 may connect the pressure from return passage 24 with pilot pressure limiter 54. When the pressure of fluid passing through resolver 52 exceeds a threshold limit, pilot pressure limiter 54 may move from a flow-blocking position toward a flow-passing position. It is contemplated that the threshold limit of pilot pressure limiter 54 may be tunable, if desired, such that a responsiveness or performance of hydraulic fan circuit 10 may be adjusted.

Pilot pressure limiter 54 may be in fluid communication with a pilot passage 56 that extends between charge pump 38 and a displacement actuator 58 of primary pump 14. Specifically, pilot pressure limiter 54 may be connected to pilot passage 56 via a passage 61. The pilot pressure limiter 54 may comprise any type of controllable pressure limiting valve known in the art. When pilot pressure limiter 54 is controlled to move toward the flow-passing position described above, pilot fluid from within pilot passage 56 may be allowed to drain to low-pressure sump 22. The draining of pilot fluid from pilot passage 56 may reduce a pressure of fluid within pilot passage 56, and may reduce the pressure of the pilot fluid sent to and/or otherwise acting on an actuator piston of the primary pump 14. Pilot passage 56 may also communicate with low-pressure sump 22 via valve passage 42, low pressure passage 48, and pressure relief valve 50 for similar purposes. It is contemplated that the opening pressure of pilot pressure limiter 54 may be the same or different than the opening pressure of pressure relief valve 50, as desired. In an exemplary embodiment, the pilot pressure limiter 54 may limit the pressure of the pilot fluid once a predetermined pressure, such as a maximum hydraulic fan circuit pressure, has been reached. In such an embodiment, the pilot pressure limiter 54 may prevent the speed of the fan 20 from exceeding a maximum cooling speed of the fan 20. To increase the speed of the fan 20 (and the pressure of the pilot fluid within the hydraulic fan circuit 10) beyond the maximum cooling speed, the pilot pressure limiter 54 may be recalibrated for a higher variable pressure setting or, alternatively, the pilot pressure limiter 54 may be bypassed or overridden. In exemplary embodiments, the pilot pressure limiter 54 may be configured to ensure that the pressure of the pilot fluid, and the corresponding speed of the fan 20, may not exceed respective maximum values in the event of an unexpected malfunction of one or more pressure control valves or other pressure control components of the hydraulic fan circuit 10.

The pilot fluid in pilot passage 56 may be selectively communicated with displacement actuator 58 to affect a displacement change of primary pump 14. Displacement actuator 58 may embody a double-acting, spring-biased cylinder connected to move a swashplate, a spill valve, or another displacement-adjusting mechanism of primary pump 14. When pilot fluid of a sufficient pressure is introduced into one end of displacement actuator 58, displacement actuator 58 may move the displacement-adjusting mechanism of primary pump 14 by an amount corresponding to the pressure of the fluid.

A directional control valve 60 may be associated with displacement actuator 58 to control what end of displacement actuator 58 receives the pressurized pilot fluid and, accordingly, in which direction (i.e., which of a displacement-increasing and a displacement-decreasing direction) the displacement-adjusting mechanism of primary pump 14 is moved by displacement actuator 58. Directional control valve 60 may be a spring-biased, solenoid-actuated control valve that is movable based on a command from a controller 68. Directional control valve 60 may move between a first position at which a first end of displacement actuator 58 receives pressurized pilot fluid, and a second position at which a second opposing end of displacement actuator 58 receives pressurized pilot fluid. When the first end of displacement actuator 58 is receiving pressurized pilot fluid (i.e., when directional control valve 60 is in the first position), the second end of displacement actuator 58 is simultaneously connected to low-pressure sump 22 via directional control valve 60. Similarly, when the second end of displacement actuator 58 is receiving pressurized pilot fluid (i.e., when directional control valve 60 is in the second position), the first end of displacement actuator 58 is simultaneously connected to low-pressure sump 22 via directional control valve 60. Restrictive orifices 62 may be associated with the ends of displacement actuator 58 and/or with pilot passage 56 to help reduce pressure fluctuations in the entering and exiting flows of pilot fluid and thereby stabilize fluctuations in a speed of pump displacement changes.

A pressure control valve 64 may also be associated with pilot passage 56 and displacement actuator 58, and configured to control movement of displacement actuator 58 by varying a pressure of pilot passage 56. Pressure control valve 64 may be movable from a first (open) position (shown in FIG. 2) at which all pilot fluid from charge pump 38 is passed through directional control valve 60 to displacement actuator 58, toward a second (closed) position at which a portion or all of the pilot fluid is drained to low-pressure sump 22 before reaching displacement actuator 58. Pressure control valve 64 may be movable from the first position toward the second position based on a command from controller 68. It is contemplated that pressure control valve 64 may be directly controlled via a solenoid (shown in FIG. 2) or, alternatively, pilot operated via a separate solenoid valve (not shown), as desired. By selectively moving pressure control valve 64 between the first and second positions, a pressure of the pilot fluid in communication with displacement actuator 58 and, hence, a displacement of primary pump 14 and a corresponding speed of the fan 20 may be controlled. In an exemplary embodiment, the pressure control valve 64 may be biased toward the first (open) position by any spring, magnetic, and/or other known biasing means.

An override valve 66 may be associated with the pilot pressure limiter 54 and the resolver 52. In an exemplary embodiment, the override valve 66 may be fluidly connected between the resolver 52 and the pilot pressure limiter 54 so as to selectively fluidly connect the pilot pressure limiter 54 to the resolver 52. In particular, override valve 66 may be a two-position, two-way, solenoid-actuated valve movable between a first (open) position (shown in FIG. 2) at which pressurized fluid from the pressure limiting passage 34 passes from the resolver 52 to the pilot pressure limiter 54, and a second (closed) position, at which fluid from the resolver 52 is blocked from passing to the pilot pressure limiter 54. For example, where a pressure of the pilot fluid in supply passage 26 has been reduced by the pressure control valve 64, or other hydraulic fan circuit components, to reduce rotational speed of the fan 20, and/or where additional reduction in fan speed is required beyond a maximum cooling speed of the fan 20, the solenoid of the override valve 66 may be activated to close the override valve 66 and prohibit passage of fluid from the resolver 52 to the pilot pressure limiter 54. Actuating the override valve 66 in this way may prevent discharge fluid from the return passage 24 from acting on the pilot pressure limiter 54 regardless of the pressure of such discharge fluid. Such actuation of the override valve 66 may also result in an increase in fluid pressures elsewhere in the hydraulic fan circuit 10. Override valve 66 may be biased toward the first (open) position by any spring, magnetic and/or other known biasing means, and may be moved to the second (closed) position in response to a command from controller 68 during an overrunning condition of motor 18. Alternatively, the override valve 66 may be pilot operated via a separate solenoid valve (not shown). While in the first position, the override valve 66 may permit discharge pressure to act upon the pilot pressure limiter 54, and biasing the override valve 66 toward the first position may facilitate functionality of the pilot pressure limiter 54 in the event of unexpected power loss.

Controller 68 may embody a single or multiple microprocessors, field programmable gate arrays (FPGAs), digital signal processors (DSPs), etc. that include a means for controlling an operation of hydraulic fan circuit 10 in response to signals received from one or more engine sensors 70. Numerous commercially available microprocessors can be configured to perform the functions of controller 68. It should be appreciated that controller 68 could readily embody a microprocessor separate from that controlling other engine- and/or machine-related functions, or that controller 68 could be integral with an engine or machine system microprocessor and be capable of controlling numerous engine and/or machine functions and modes of operation. If separate from the general engine or machine system microprocessor, controller 68 may communicate with these other microprocessors via datalinks or other methods. Various other known circuits may be associated with controller 68, including power supply circuitry, signal-conditioning circuitry, actuator driver circuitry (i.e., circuitry powering solenoids, motors, or piezo actuators), and communication circuitry.

Controller 68 may be in communication with directional control valve 60, pressure control valve 64, override valve 66, and engine sensor(s) 70 to control operations of hydraulic fan circuit 10 during at least two distinct modes of operation. The modes of operation may include a normal mode during which primary pump 14 drives motor 18 to cool engine 12, and a brake assist mode during which fan speed is increased above a maximum cooling speed of the fan 20 (but below a fan speed corresponding to the structural limits of the fan 20, motor 18, and other components of the hydraulic fan circuit 10) to assist in reducing the speed of the engine 12. These modes of operation will be described in more detail in the following section to further illustrate the disclosed concepts.

INDUSTRIAL APPLICABILITY

The disclosed hydraulic fan circuit may be utilized with any engine system where engine cooling and/or engine braking is desired. The disclosed hydraulic fan circuit 10 may provide for engine braking by increasing fan speed for a brief interval during a period of peak engine speed. Such increased fan speed may be facilitated by the override valve 66 associated with the pilot pressure limiter 54 and the resolver 52. For example, in situations where a heightened level of engine braking is required and/or requested, such as when braking assistance provided to the engine 12 by operating the fan 20 at or below the maximum cooling speed is insufficient to satisfy engine braking needs, the override valve 66 may be activated to override a limitation of the pressure of the pilot fluid. By overriding such limitations, the pressure of the pilot fluid may be allowed to temporarily increase, thereby increasing the speed of the fan 20 above the maximum cooling speed. In addition, whether operating the hydraulic fan circuit 10 in the normal mode or the brake assist mode, the controller 68 may be configured for automatic self-calibration. Operation of hydraulic fan circuit 10 will now be described.

During the normal mode of operation, engine 12 may drive primary pump 14 to rotate and pressurize fluid. The pressurized fluid may be discharged from primary pump 14 into supply passage 26 and directed into motor 18. As the pressurized fluid passes through motor 18, hydraulic power in the fluid may be converted to mechanical power used to rotate fan 20. As fan 20 rotates, a flow of air may be generated that facilitates cooling of engine 12. Fluid exiting motor 18, having been reduced in pressure, may be directed back to primary pump 14 via return passage 24 to repeat the cycle.

The fluid discharge direction and displacement of pump 14 during the normal mode of operation may be regulated based on signals from engine sensor(s) 70, for example based on an engine speed signal, an engine temperature signal, an engine coolant temperature, and/or another similar signal. Controller 68 may receive these signals and reference a corresponding engine speed, engine temperature, or other similar parameter with one or more lookup maps stored in memory to determine a desired discharge direction and displacement setting of primary pump 14 and a corresponding rotation direction and speed of fan 20. Controller 68 may then generate appropriate commands to be sent to directional control valve 60 and pressure control valve 64 to affect corresponding adjustments to the displacement of primary pump 14.

At some point during use, braking of the engine 12 may be required. One or more parasitic loads associated with the engine 12, such as for example, the hydraulic fan circuit 10 may be utilized to assist in such braking. As described above, to assist with such braking the charge pump 38 may be configured to generate a pressurized flow of pilot fluid and to direct the pilot fluid to the displacement actuator 58 via the directional control valve 60. The pressure control valve 64 may utilize the flow of pilot fluid to, for example, control the displacement actuator 58 such that fluid pressure within the hydraulic fan circuit 10 and/or of a flow of fluid from the primary pump 14 to the motor 18 is increased. Such an increase in pressure may result in a corresponding increase in fan speed, thereby braking the engine 12. The fluid pressure of the hydraulic fan circuit 10 may be increased up to a maximum cooling speed of the fan 20. This increase in circuit pressure may be limited to the maximum cooling speed of the fan 20 by the pilot pressure limiter 54, which may reduce the pilot pressure sent to the pump 14. In an exemplary embodiment, the pilot pressure limiter 54 may begin limiting the pressure of the pilot fluid once the maximum cooling speed of the fan 20 has been reached. In additional exemplary embodiments, the pilot pressure limiter 54 may begin limiting the pressure of the pilot fluid once a predetermined maximum pressure of the hydraulic fan circuit 10 has been reached, and such a maximum pressure may correspond to a pressure limit of any of the components included in the circuit 10.

In exemplary embodiments, the maximum cooling speed of the fan 20 may be selected to ensure safe operation of the fan 20. The maximum cooling speed may be, however, substantially less than, for example, a maximum speed the fan 20 is capable of attaining without structural damage. Accordingly, exemplary embodiments of the present disclosure may operate the fan 20 at speeds above the maximum cooling speed but below a speed corresponding to the structural limits of the fan 20, motor 18, and other components of the hydraulic fan circuit 10, in order to utilize the maximum braking assistance available from the hydraulic fan circuit 10.

For example, when it has been determined that additional engine braking is required, the controller 68 may energize the solenoid of the override valve 66, thereby transitioning the override valve 66 from the open position permitting fluid flow between the resolver 52 and the pilot pressure limiter 54, to the closed position blocking fluid flow between the resolver 52 and the pilot pressure limiter 54. It is understood that the determination whether additional engine braking is required may be made manually by an operator of the engine 12 or semi-automatically by the controller 68. The controller 68 may make such a determination by, for example, comparing one or more inputs from the sensors 70 and/or the operator with any of a number of performance characteristic maps stored in a memory associated with the controller 68.

Closing the override valve 66 may prevent discharge pressure from the resolver 52 from acting upon the pressure limiter 54 regardless of the pressure in the return passage 24, and may result in an increase in pressure in the supply passage 26. This increase in pressure may be controlled to any desirable level by the pressure control valve 64. In an exemplary embodiment, the increase in pressure in the supply passage 26, and the corresponding increase in the speed of the fan 20, may be controlled and/or maintained for any period of time effective to reduce a speed of the engine 12 to an acceptable and/or desired level. In an exemplary embodiment, such a period of time may be between approximately one second and approximately thirty seconds. In still further embodiments, however, this period of time may be greater than thirty seconds. Once it has been determined that braking assistance is no longer required, the controller 68 may de-energize the solenoid of the override valve 66, thereby transitioning the override valve 66 from the closed position to the open position.

In each of the exemplary embodiments described herein, components associated with the hydraulic fan circuit 10 may be configured to perform one or more automatic calibration routines during use. Such calibration may, for example, determine a pressure of the motor 18 required to achieve the maximum cooling speed of the fan 20. While known systems may be calibrated upon assembly, and manually thereafter, the automatic calibration capabilities of the present disclosure may eliminate the uncertainty associated with manual calibration, as well as the time, labor, and costs associated with the machine downtime required to perform manual calibration.

During an exemplary automatic calibration routine, the controller 68 may select and/or otherwise determine a target fan speed. In an exemplary embodiment, the target fan speed may be the maximum cooling speed of the fan 20, and in further exemplary embodiments, the target fan speed may be preset, predetermined, and/or stored in the memory associated with the controller 68. The controller 68 may then send a relatively low current control signal to the pressure control valve 64 to facilitate relatively low speed operation of the fan 20. At this stage of the calibration, the fan 20 may be operating at a speed below the target fan speed, and the actual speed of the fan 20 may be sensed and/or otherwise determined by one or more sensors. Such sensors may be similar to the engine sensors 70 described above, and may be, for example, speed sensors configured to measure the rotational speed of a shaft of the fan motor 18. In further exemplary embodiments, such sensors may be configured to measure a rotational speed of one or more components of the fan 20. In still further embodiments, such sensors may be virtual sensors configured to determine fan speed based on, for example, a pressure of the fluid driving the motor 18.

The one or more sensors may send a signal indicative of fan speed to the controller 68, and the controller 68 may incrementally increase the speed of the fan 20 in response. In an exemplary embodiment, the controller 68 may incrementally increase the current control signal sent to the pressure control valve 64 to gradually increase the speed of the fan 20. The fan speed may be increased in this way until the fan 20 reaches the target fan speed. The magnitude of the current control signal sent to the pressure control valve 64 associated with achieving the target fan speed may then be recorded and/or otherwise stored in the memory associated with the controller 68. Once this magnitude value has been determined, the controller 68 may send current control signals, having the determined magnitude, to the pressure control valve 64 in one or more subsequent processes in which the maximum cooling speed of the fan 20 is required.

This calibration routine may be performed at regular intervals during operation of the engine 12 or, alternatively, such a calibration routine may be performed each time the fan 20 is controlled to operate at the maximum cooling speed. In still other exemplary embodiments, such a calibration routine may be performed upon start-up, after service is provided to the hydraulic fan system 10, and/or after one or more components of the hydraulic fan system 10 has been modified or replaced. The determined magnitude of the current control signal may be modified in each subsequent calibration routine based on changes in, for example, engine speed, engine temperature, engine coolant temperature, oil quality/type, and/or other characteristics of the engine system 140.

In exemplary embodiments, one or more of the current control signals sent to the pressure control valve 64 may substantially correspond to a particular speed of the fan 20. Such corresponding current and fan speed values may be used by the controller 68 to generate one or more curves illustrating the relationship of current vs. speed for the particular engine system 140 and/or hydraulic fan circuit 10. It is understood that such curves may be utilized to perform a variety of diagnostic and/or analytic functions. For example, the shape and/or slope of the curve may be utilized to calculate an initial (or open loop) current control signal for a given fan speed.

In additional exemplary embodiments, the calibration routines described herein may be utilized as diagnostic tools. For example, the determined magnitudes of the current control signals may be stored in the memory of the controller 68, and these values may be compared to current control signals determined and stored previously, such as on previous days. Such comparisons may indicate increases and/or decreases of the required current over time. For example, a continual increase in the current required to reach a given fan speed (such as a maximum cooling speed of the fan 20 or any other target fan speed) may be an indication of fan 20, motor 18, and/or pump 14 wear. In additional exemplary embodiments, a continued decrease in the current required to reach a given fan speed may be indicative of damage to the fan 20 or other hydraulic fan circuit components. Accordingly, the controller

68 may be configured to deliver one or more signals and/or alarms to on operator, depending on such comparisons, indicating a need for circuit maintenance and/or repair.

It will be apparent to those skilled in the art that various modifications and variations can be made to the disclosed hydraulic fan circuit. Other embodiments will be apparent to those skilled in the art from consideration of the specification and practice of the disclosed hydraulic fan circuit. It is intended that the specification and examples be considered as exemplary only, with a true scope being indicated by the following claims and their equivalents.

What is claimed is:

1. A hydraulic fan circuit, comprising:
    a primary pump;
    a motor fluidly connected to the primary pump;
    a fan operably connected to and driven by the motor;
    a supply passage extending from the primary pump to the motor;
    a return passage extending from the motor to the primary pump;
    a pressure limiting valve configured to selectively reduce pressure of a flow of pilot fluid directed to the primary pump; and
    an override valve configured to selectively connect the supply passage to the pressure limiting valve.

2. The hydraulic fan circuit of claim 1, wherein the override valve is configured to selectively disconnect the pressure limiting valve from the return passage.

3. The hydraulic fan circuit of claim 1, wherein the override valve is a two-way, solenoid-actuated valve.

4. The hydraulic fan circuit of claim 1, further comprising a pressure resolver configured to fluidly connect the pressure limiting valve to at least one of the supply passage and the return passage via the override valve.

5. The hydraulic fan circuit of claim 4, wherein the pressure resolver is configured to connect the one of the supply and the return passage having the higher pressure with the pressure limiting valve.

6. The hydraulic fan circuit of claim 4, wherein transitioning the pressure limiting valve toward a flow-passing position permits a portion of the flow of pilot fluid to drain to a low-pressure sump.

7. The hydraulic fan circuit of claim 1, further comprising a pressure control valve operable to control a displacement of the primary pump.

8. The hydraulic fan circuit of claim 7, wherein the pressure control valve is operable to control a speed of the fan.

9. The hydraulic fan circuit of claim 7, further comprising:
    a displacement actuator operably connected to the primary pump; and
    a charge pump configured to generate the flow of pilot fluid, the pressure control valve directing the pilot fluid to affect movement of the displacement actuator.

10. The hydraulic fan circuit of claim 9, wherein the charge pump is connected to the primary pump, and the charge and primary pumps are driven by a combustion engine.

11. A hydraulic fan circuit, comprising:
    a primary pump;
    a motor driven by the primary pump;
    a fan connected to and driven by the motor;
    a pressure control valve configured to receive a flow of pilot fluid and to control a speed of the fan;
    a supply passage and a return passage, the supply and return passages fluidly connecting the motor to the primary pump in a closed circuit configuration;
    a pressure resolver fluidly connected to the supply and return passages;
    a pressure limiting valve fluidly connected to the pressure resolver and configured to prevent the fan from exceeding a maximum cooling speed by limiting pressure of the flow of pilot fluid; and
    an override valve fluidly connected between the pressure resolver and the pressure limiting valve, the override valve configured to assist in increasing the speed of the fan above the maximum cooling speed.

12. The hydraulic fan circuit of claim 11, wherein the maximum cooling speed is less than a fan speed corresponding to a structural limit of the fan.

13. The hydraulic fan circuit of claim 11, further comprising a displacement actuator associated with the primary pump, and a charge pump configured to generate the flow of pilot fluid.

14. The hydraulic fan circuit of claim 11, wherein the pressure limiting valve is fluidly connected to the pressure control valve.

15. The hydraulic fan circuit of claim 11, wherein the override valve and the pressure control valve are biased toward respective open positions permitting passage of fluid.

16. The hydraulic fan circuit of claim 11, wherein the primary pump is driven by a combustion engine, and wherein transitioning the override valve from an open position permitting passage of fluid between the pressure resolver and the pressure limiting valve, and a closed position blocking passage of fluid between the pressure resolver and the pressure limiting valve reduces a speed of the engine.

17. A method of reducing engine speed with a hydraulic fan circuit, comprising:
    driving a primary pump with a combustion engine;
    directing a pressurized flow of fluid from the primary pump to a fan motor;
    generating a flow of air with a fan connected to the fan motor, the flow of air assisting in cooling the engine;
    receiving a request for engine speed reduction; and
    responsively increasing a speed of the fan above a maximum cooling speed and below a fan speed corresponding to a structural limit of the fan, wherein responsively increasing the speed of the fan comprises overriding a fluid pressure limitation associated with at least one of the primary pump and the fan motor.

18. The method of claim 17, wherein overriding the fluid pressure limitation comprises transitioning an override valve from an open position permitting passage of fluid between a pressure resolver and a pressure limiting valve, and a closed position blocking passage of fluid between the pressure resolver and the pressure limiting valve.

19. The method of claim 17, wherein directing the pressurized flow of fluid comprises:
    selecting a target fan speed;
    incrementally increasing the speed of the fan until the speed of the fan is substantially equal to the target fan speed;
    storing an electrical current value corresponding to the speed of the fan substantially equaling the target fan speed; and
    directing an electrical current having a magnitude equal to the stored electrical current value to a valve in fluid communication with the primary pump and the fan motor.

20. The method of claim 19, further comprising incrementally sensing the speed of the fan with a speed sensor associated with the fan motor.

* * * * *